United States Patent
Muramatsu

(10) Patent No.: US 11,156,169 B2
(45) Date of Patent: Oct. 26, 2021

(54) ENGINE CONTROL APPARATUS

(71) Applicant: SUBARU CORPORATION, Tokyo (JP)

(72) Inventor: Konosuke Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/915,172

(22) Filed: Jun. 29, 2020

(65) Prior Publication Data

US 2021/0095603 A1   Apr. 1, 2021

(30) Foreign Application Priority Data

Sep. 30, 2019  (JP) ............................. JP2019-179096

(51) Int. Cl.
  *F02D 11/10* (2006.01)
  *F02D 9/02* (2006.01)
  (Continued)

(52) U.S. Cl.
  CPC .............. *F02D 11/105* (2013.01); *F02D 9/02* (2013.01); *F02D 41/0007* (2013.01); *F02D 41/2422* (2013.01); *F02D 41/2451* (2013.01); *F02D 41/10* (2013.01); *F02D 2009/022* (2013.01); *F02D 2009/0225* (2013.01); *F02D 2009/0227* (2013.01); *F02D 2009/0235* (2013.01); *F02D 2009/0255* (2013.01); (Continued)

(58) Field of Classification Search
  None
  See application file for complete search history.

(56) References Cited

U.S. PATENT DOCUMENTS 4,714,067 A * 12/1987 Staerzl .................... F02D 41/28
                                                                123/478
5,481,462 A *  1/1996 Nagai ................. F02D 41/0072
                                                                701/101
(Continued)

FOREIGN PATENT DOCUMENTS

JP      H02-37136 A       2/1990
JP      H0237136 A  *     2/1990  ............ F02D 11/105
(Continued)

*Primary Examiner* — Kevin R Steckbauer
(74) *Attorney, Agent, or Firm* — McGinn I. P. Law Group, PLLC.

(57) ABSTRACT

An engine control apparatus includes a throttle valve, an accelerator opening detector, a throttle opening controller, and an intake air density detector. The throttle valve is configured to regulate an intake air volume of an engine. The accelerator opening detector is configured to detect an accelerator opening that is an operation amount of an accelerator operation member with which a driver operates an accelerator. The throttle opening controller is configured to increase a throttle opening of the throttle valve in accordance with an increase in the accelerator opening. The intake air density detector is configured to detect information about an intake air density of the engine. In a low intake air density state where the intake air density is a predetermined value or lower, the throttle opening controller decreases a sensitivity of the throttle opening relative to the accelerator opening in a partial range of a range where the accelerator opening is variable.

20 Claims, 7 Drawing Sheets

(51) Int. Cl.
  *F02D 41/00* (2006.01)
  *F02D 41/24* (2006.01)
  *F02D 41/10* (2006.01)
  *F02D 41/14* (2006.01)
(52) U.S. Cl.
  CPC .. *F02D 2041/1422* (2013.01); *F02D 2200/04* (2013.01); *F02D 2200/0402* (2013.01); *F02D 2200/0404* (2013.01); *F02D 2200/0406* (2013.01); *F02D 2200/0414* (2013.01); *F02D 2200/0602* (2013.01); *F02D 2200/602* (2013.01); *F02D 2200/703* (2013.01)

(56) References Cited

U.S. PATENT DOCUMENTS

| | | | | |
|---|---|---|---|---|
| 7,676,319 | B2* | 3/2010 | Hano | F01L 1/3442 |
| | | | | 701/103 |
| 7,991,536 | B2* | 8/2011 | Eiraku | F02D 23/02 |
| | | | | 701/103 |
| 8,935,080 | B2* | 1/2015 | Szwabowski | F02D 13/0203 |
| | | | | 701/110 |
| 9,062,614 | B2* | 6/2015 | Szwabowski | F02D 41/0002 |
| 10,309,321 | B2* | 6/2019 | Kim | F02D 11/02 |
| 10,612,455 | B2* | 4/2020 | Romana | F02B 29/0462 |
| 2006/0155451 | A1* | 7/2006 | Kuwahara | B60W 30/1819 |
| | | | | 701/51 |
| 2008/0109145 | A1* | 5/2008 | Eiraku | F02D 23/02 |
| | | | | 701/103 |
| 2009/0018754 | A1* | 1/2009 | Hano | F01L 1/3442 |
| | | | | 701/103 |
| 2013/0197775 | A1* | 8/2013 | Szwabowski | F02D 13/0203 |
| | | | | 701/101 |
| 2015/0127241 | A1* | 5/2015 | Szwabowski | F02D 28/00 |
| | | | | 701/103 |
| 2019/0003399 | A1* | 1/2019 | Kim | F02D 41/10 |
| 2019/0162109 | A1* | 5/2019 | Romana | F02D 41/0005 |
| 2020/0191046 | A1* | 6/2020 | Romana | F02B 29/0418 |

FOREIGN PATENT DOCUMENTS

| | | |
|---|---|---|
| JP | H02-301634 A | 12/1990 |
| JP | 2009-024547 A | 2/2009 |

* cited by examiner

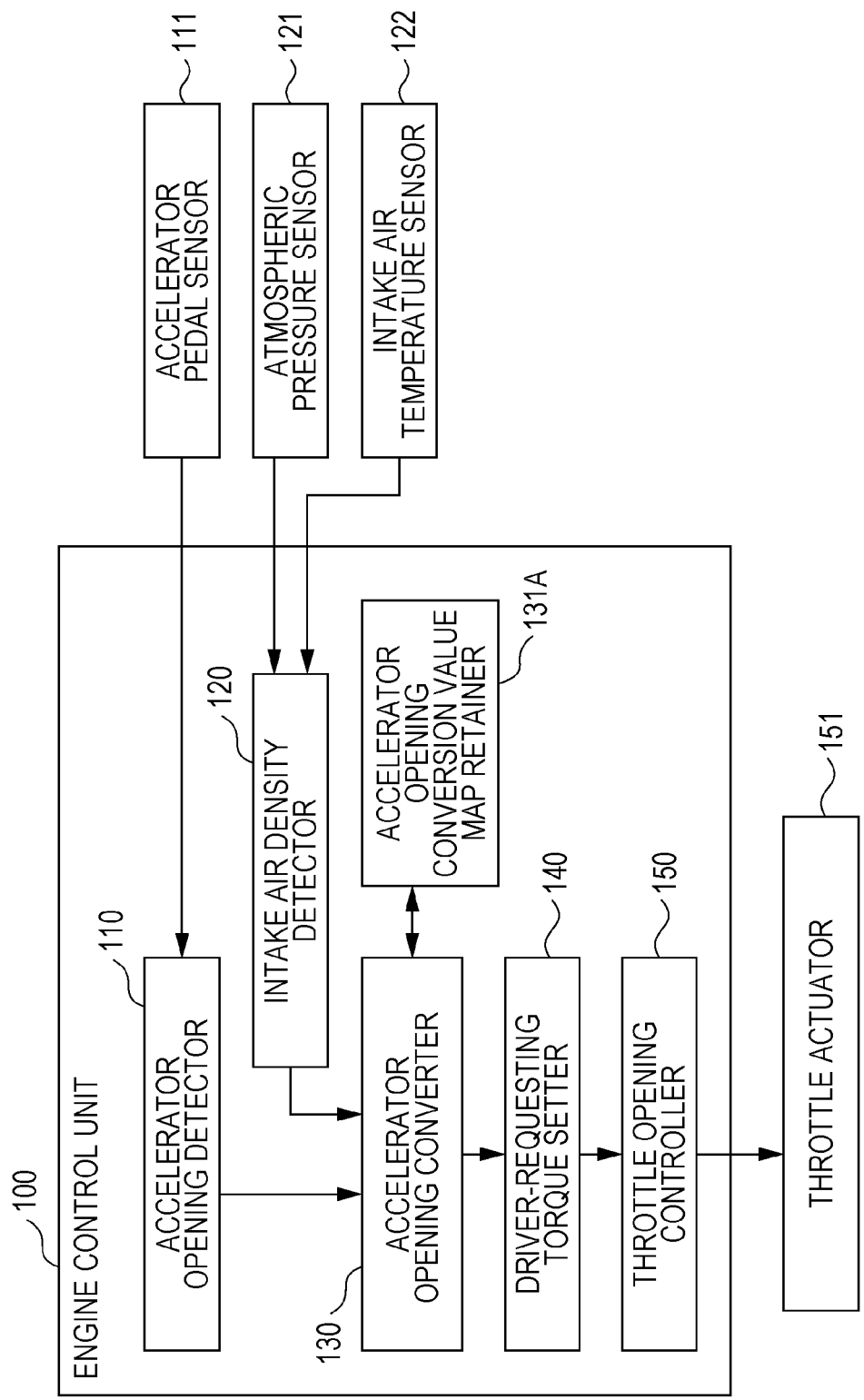

ENGINE CONTROL APPARATUS

CROSS-REFERENCE TO RELATED APPLICATIONS

The present application claims priority from Japanese Patent Application No. 2019-179096 filed on Sep. 30, 2019, the entire contents of which are hereby incorporated by reference.

BACKGROUND

The disclosure relates to an engine control apparatus that controls the throttle opening of an engine.

For instance, in a gasoline engine that is mounted in an automobile, such as a car, a throttle valve that narrows an intake duct to regulate the intake air volume is used to perform output control in a natural aspiration range that is not a supercharging range.

Currently, an electronically controlled throttle that drives a throttle valve with a motor-driven actuator is in the mainstream. In an engine having such an electronically controlled throttle, for instance, a driver-requesting torque is set in accordance with an accelerator operation by the driver, and the throttle opening, the supercharging pressure, the valve timing, the ignition timing, the fuel injection quantity and injection timing, the exhaust gas recirculation (EGR) ratio, etc. are controlled so that the actual torque output from the engine matches the driver-requesting torque to the extent possible.

As the related art regarding control of an electronically controlled throttle valve, for instance, Japanese Unexamined Patent Application Publication No. H2-37136 describes a technique in which the reference opening of a throttle valve is obtained on the basis of the accelerator opening and the engine speed, and thereafter, a correction coefficient based on detected atmospheric pressure is determined, and the reference opening of the throttle valve is multiplied by the correction coefficient to make atmospheric pressure correction.

Japanese Unexamined Patent Application Publication No. 2009-24547 describes a technique in which when irregularities of a road surface are determined, a moderating process is performed for the accelerator opening to suppress fluctuations in acceleration due to the disturbance caused by the road surface, thereby reducing fluctuations in the output of an internal combustion engine and improving the riding comfort, traveling performance, and handleability of the vehicle.

Japanese Unexamined Patent Application Publication No. H2-301634 describes a technique in which a different filter is applied to the output of an accelerator opening detector in accordance with the driver's driving preference, thereby changing the moderation rate of the throttle valve opening relative to the change rate of the accelerator opening.

SUMMARY

An aspect of the disclosure provides an engine control apparatus including a throttle valve, an accelerator opening detector, a throttle opening controller, and an intake air density detector. The throttle valve is configured to regulate an intake air volume of an engine. The accelerator opening detector is configured to detect an accelerator opening that is an amount of operation of an accelerator operation member on which a driver performs an accelerator operation. The throttle opening controller is configured to increase a throttle opening of the throttle valve in accordance with an increase in the accelerator opening. The intake air density detector is configured to detect information about an intake air density of the engine. In a low intake air density state where the intake air density is equal to or lower than a predetermined value, the throttle opening controller decreases a sensitivity of the throttle opening relative to the accelerator opening in a partial range of a range within which the accelerator opening is variable.

An aspect of the disclosure provides an engine control apparatus including a throttle valve and circuitry. The throttle valve is configured to regulate an intake air volume of an engine. The circuitry is configured to detect an accelerator opening that is an amount of operation of an accelerator operation member on which a driver performs an accelerator operation, increase a throttle opening of the throttle valve in accordance with an increase in the accelerator opening, detect information about an intake air density of the engine, and in a low intake air density state where the intake air density is equal to or lower than a predetermined value, decrease a sensitivity of the throttle opening relative to the accelerator opening in a partial range of a range within which the accelerator opening is variable.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 6 is a block diagram schematically illustrating a configuration for throttle opening control in an engine control apparatus according to a second embodiment of the disclosure.

DETAILED DESCRIPTION

To attain a torque the same as that at normal times (at the time of normal pressure) in an environment, such as a highland area, where atmospheric pressure is low (at the time of low pressure), the throttle valve opening is to be increased relative to that at normal times.

As a result, for instance, in constant torque control for matching a target torque, such as a driver-requesting torque, and the actual torque of the engine, even if the amount of accelerator operation is very small, a range where the throttle opening changes to a large degree may appear in the low pressure environment. For instance, also in a case where the accelerator pedal moves by a very small amount due to vibrations, etc. caused by, for instance, irregularities of a road surface, the throttle opening sensitively responds (hunting), which compromises drivability (easiness of driving) and comfort.

Accordingly, it is desirable to provide an engine control apparatus that properly controls the opening of the throttle valve regardless of a change in the intake air density.

First Embodiment

A first embodiment of an engine control apparatus to which the disclosure is applied will be described.

The engine control apparatus of the first embodiment is provided for, for instance, a horizontally-opposed four-cylinder gasoline direct-injection turbocharging engine that is mounted in an automobile, such as a car, as a power source for traveling.

Figure 1:
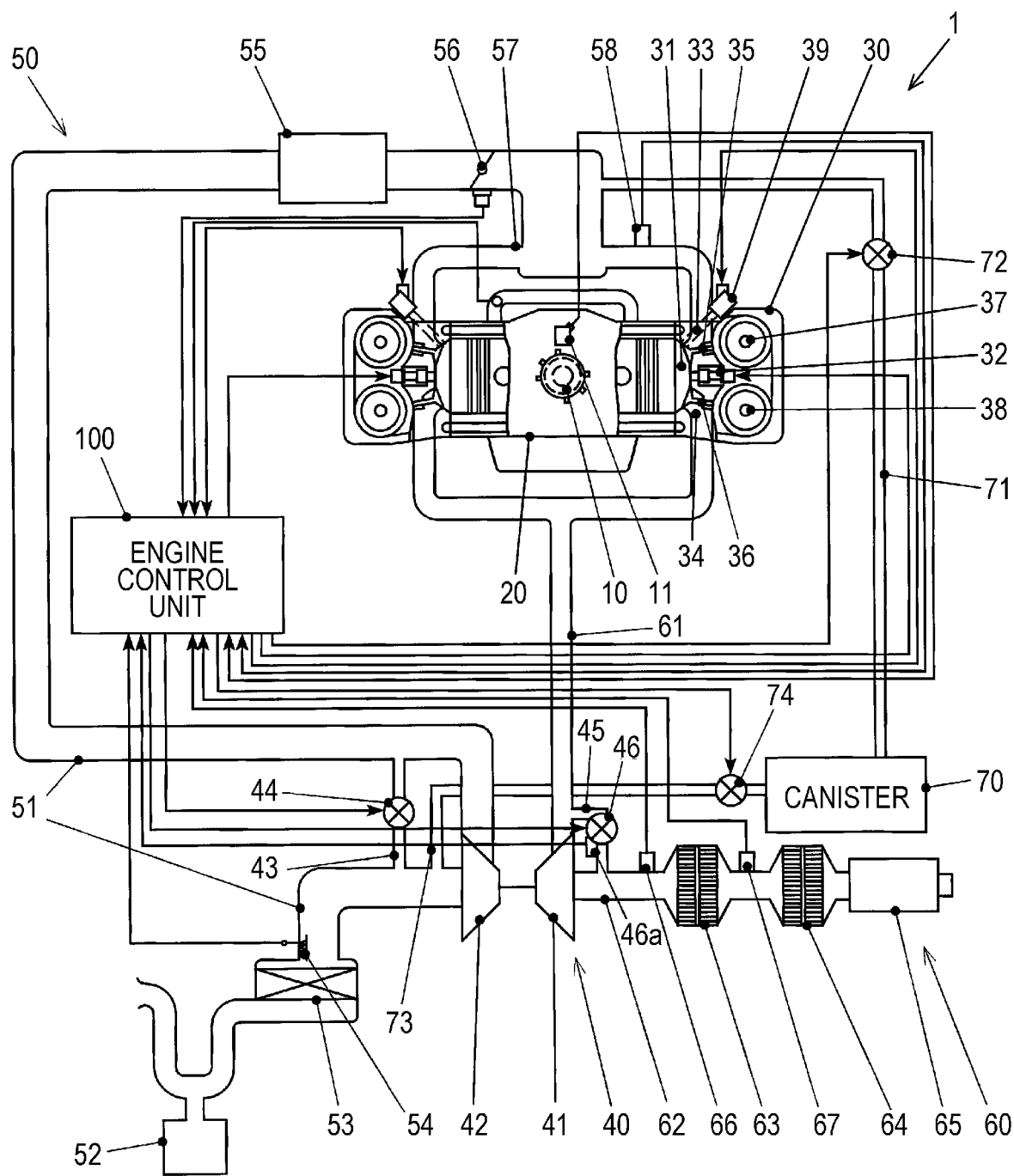
FIG. 1 is a diagram schematically illustrating a configuration of an engine having an engine control apparatus according to a first embodiment of the disclosure.

FIG. 1 is a diagram schematically illustrating a configuration of an engine 1 having the engine control apparatus of the first embodiment.

The engine 1 includes a crank shaft 10, a cylinder block 20, a cylinder head 30, a turbocharger 40, an intake system 50, an exhaust system 60, a canister 70, an engine control unit (ECU) 100, etc.

The crank shaft 10 is a rotating shaft that serves as the output shaft of the engine 1.

To one end of the crank shaft 10, a power transmission device, such as a transmission, not illustrated is coupled.

To the crank shaft 10, a piston is coupled with a connecting rod not illustrated therebetween.

At an end of the crank shaft 10, a crank angle sensor 11 that detects the angle position of the crank shaft 10 is provided.

The output of the crank angle sensor 11 is transmitted to the engine control unit 100.

The cylinder block 20 is divided into two banks such that the crank shaft 10 is sandwiched therebetween in the right-left direction in a case of vertical installation in the car body.

In the center of the cylinder block 20, a crank case that houses the crank shaft 10 and has a main bearing rotatably holding the crank shaft 10 is provided.

In each of the right and left banks of the cylinder block 20 that are disposed on the right and on the left with the crank case therebetween, a pair of cylinders (in a case of four-cylinder) in which pistons are inserted and reciprocate are included.

The cylinder head 30 is provided at ends (right and left ends) of the cylinder block 20 opposite to the crank shaft 10.

The cylinder head 30 includes a combustion chamber 31, an ignition plug 32, an intake port 33, an exhaust port 34, an intake valve 35, an exhaust valve 36, an intake camshaft 37, an exhaust camshaft 38, an injector 39, etc.

The combustion chamber 31 is provided at a location that faces the piston crown surface of the cylinder head 30 as, for instance, a pent-roof dent.

The ignition plug 32 is provided in the center of the combustion chamber 31 and makes a spark in response to an ignition signal from the engine control unit 100 to ignite an air-fuel mixture.

The intake port 33 is a flow passage for introducing combustion air (fresh air) into the combustion chamber 31.

The exhaust port 34 is a flow passage for exhausting burned gas (exhaust gas) from the combustion chamber 31.

The intake valve 35 and the exhaust valve 36 open and close the intake port 33 and the exhaust port 34 respectively at predetermine valve timings.

For instance, two intake valves 35 and two exhaust valves 36 are provided for each cylinder.

The intake valve 35 and the exhaust valve 36 are opened and closed by the intake camshaft 37 and the exhaust camshaft 38 respectively that rotate in synchronization with a rotation speed half the rotation speed of the crank shaft 10.

At a cam sprocket of each of the intake camshaft 37 and the exhaust camshaft 38, a valve timing changing mechanism not illustrated is provided that changes the open timing and the close timing of each valve by advancing or retarding the phase of each camshaft.

The injector 39 is provided at the interval of the intake port 33 in the cylinder head 30 and injects a fuel into the combustion chamber 31 in response to a valve open signal issued from the engine control unit 100 to form an air-fuel mixture.

The turbocharger 40 is a supercharger that uses the energy of exhaust from the engine 1 to compress combustion air (fresh air) for supercharging.

The turbocharger 40 includes a turbine 41, a compressor 42, an air bypass flow passage 43, an air bypass valve 44, a waste gate flow passage 45, a waste gate valve 46, etc.

The turbine 41 is driven by exhaust gas from the engine 1 to rotate.

The compressor 42 is affixed so as to be concentric with the turbine 41 and is driven by the turbine 41 to rotate and compress air.

The air bypass flow passage 43 is a passage for extracting part of air from the downstream side of the compressor 42 and recirculating the air to the upstream side of the compressor 42.

The air bypass valve 44 is provided on the air bypass flow passage 43 and is switched between two stages, namely, a close state where the air bypass flow passage 43 is substantially closed in response to a command from the engine control unit 100 and an open state where air is allowed to pass through the air bypass flow passage 43.

The air bypass valve 44 is a motor-driven valve having a valve body that is driven by a motor-driven actuator to open and close.

For instance, in a case where a throttle valve 56 is abruptly closed, the air bypass valve 44 is switched to the open state for preventing surging of the turbocharger 40, protecting the blades, etc. to recirculate air in the intake duct downstream of the compressor 42 to the upstream side of the compressor 42, thereby reducing excess pressure.

The waste gate flow passage 45 is a passage for extracting part of exhaust gas from the upstream side of the turbine 41 and diverting the gas to the downstream side of the turbine 41 for controlling supercharging pressure, increasing the temperature of a catalyst, etc.

The waste gate flow passage 45 is permanently affixed to the housing of the turbine 41.

The waste gate valve 46 is provided on the waste gate flow passage 45, has a valve body that opens and closes the flow passage, and controls the flow rate of exhaust gas that passes through the waste gate flow passage 45.

The waste gate valve 46 is a motor-driven waste gate valve having a motor-driven actuator that drives the valve body to open and close in response to a command from the engine control unit 100.

For the waste gate valve 46, a position sensor 46a that is a position encoder for detecting the opening position of the waste gate valve 46 is provided.

The output of the position sensor 46a is transmitted to the engine control unit 100.

The motor-driven actuator is feedback-controlled by the engine control unit 100 so that the position detected by the position sensor 46a comes closer to a predetermined target position.

The waste gate valve 46 can be switched between a full-open state and a full-close state, and any opening can be set for an intermediate position between these states.

The intake system 50 is a system for introducing air and introducing the air into the intake port 33.

The intake system 50 includes an intake duct 51, a chamber 52, an air cleaner 53, an air flow meter 54, an intercooler 55, the throttle valve 56, an intake manifold 57, an intake pressure sensor 58, etc.

The intake duct 51 is a flow passage for introducing outside air and introducing the air into the intake port 33.

The chamber 52 is a space provided near the inlet of the intake duct 51 so as to communicate with the intake duct 51.

The air cleaner 53 is provided on the intake duct 51 downstream of the location communicating with the chamber 52 to filter air and remove dust, etc.

The air flow meter 54 is provided near the outlet of the air cleaner 53 to measure the flow rate of air passing through the intake duct 51.

The output of the air flow meter 54 is transmitted to the engine control unit 100.

The compressor 42 of the turbocharger 40 is provided downstream of the air flow meter 54.

The intercooler 55 is provided on the intake duct 51 downstream of the compressor 42 and is a heat exchanger that cools air compressed and having a high temperature by heat exchange with, for instance, a wind caused by traveling.

The throttle valve 56 is provided on the intake duct 51 downstream of the intercooler 55 and is a butterfly valve that regulates the flow rate of air to control the output of the engine 1.

The throttle valve 56 is driven by a throttle actuator 151 (see FIG. 2) to open and close in response to, for instance, a driver's operation on an accelerator pedal not illustrated.

The throttle valve 56 is provided with a throttle sensor that detects the opening thereof, and the output of the throttle sensor is transmitted to the engine control unit 100.

The intake manifold 57 is provided downstream of the throttle valve 56 and is a branch pipe for distributing air to the intake port 33 of each cylinder.

The intake pressure sensor 58 detects the pressure of air (intake air pressure) inside the intake manifold 57.

The output of the intake pressure sensor 58 is transmitted to the engine control unit 100.

The exhaust system 60 is a system for externally exhausting exhaust gas exhausted from the exhaust port 34.

The exhaust system 60 includes an exhaust manifold 61, an exhaust pipe 62, a front catalyzer 63, a rear catalyzer 64, a silencer 65, an air-fuel ratio sensor 66, a rear O2 sensor 67, etc.

The exhaust manifold 61 is a collecting pipe in which exhaust gas from the exhaust port 34 of each cylinder is collected.

The turbine 41 of the turbocharger 40 is disposed on the downstream side of the exhaust manifold 61.

The exhaust pipe 62 is a pipe for externally exhausting exhaust gas from the turbine 41.

The front catalyzer 63 and the rear catalyzer 64 are provided in the middle of the exhaust pipe 62 and each include a three-way catalyst that reduces HC, NOx, CO, etc. in the exhaust gas.

The front catalyzer 63 is provided adjacent to the outlet of the turbine 41, and the rear catalyzer 64 is provided on the outlet side of the front catalyzer 63.

The silencer 65 is provided near the outlet of the exhaust pipe 62 to reduce the sound energy of the exhaust gas.

The air-fuel ratio sensor 66 is provided between the outlet of the turbine 41 and the inlet of the front catalyzer 63.

The rear O2 sensor 67 is provided between the outlet of the front catalyzer 63 and the inlet of the rear catalyzer 64.

Both the air-fuel ratio sensor 66 and the rear O2 sensor 67 generate an output voltage corresponding to the oxygen concentration of the exhaust gas to detect the oxygen content of the exhaust gas.

The air-fuel ratio sensor 66 is a linear output sensor that can detect the oxygen concentration in a wider range of air-fuel ratio than the rear O2 sensor 67 can.

Both the output of the air-fuel ratio sensor 66 and that of the rear O2 sensor 67 are transmitted to the engine control unit 100.

Fuel evaporative emissions from a fuel tank (not illustrated) in which gasoline to be used as a fuel for the engine 1 is stored are introduced into the canister (charcoal canister) 70 and temporarily occluded.

In the canister 70, activated charcoal that can temporarily absorb fuel evaporative emissions is housed in a canister case that is a resin casing.

The canister 70 includes a purge line 71 and a purge control valve 72 that are used mainly at the time of non-supercharging, and a purge line 73 and a purge control valve 74 that are used mainly at the time of supercharging, etc.

The purge line 71 has ends that are respectively coupled to the canister 70 and to the intake manifold 57 and is a flow passage for the interior of the canister 70 and that of the intake manifold 57 to communicate with each other.

The purge line 71 is a line for introducing purge gas formed of fuel evaporative emissions from the canister 70 into the intake manifold 57 at the time of non-supercharging where the interior of the intake manifold 57 is under negative pressure.

The purge control valve (PCV) 72 is a duty control solenoid valve provided in the middle of the purge line 71.

The PCV 72 can be switched between an open state and a close state in response to a command from the engine control unit 100, and the opening thereof in the open state can be set.

The purge line 73 has ends that are respectively coupled to the canister 70 and to the intake duct 51 in a location adjacent to the inlet of the compressor 42 and is a flow passage for the interior of the canister 70 and that of the intake duct 51 to communicate with each other.

The purge line 73 is a line for introducing the purge gas into the intake duct 51 upstream of the compressor 42 at the time of supercharging where the interior of the intake manifold 57 is under positive pressure and introduction of the purge gas through the purge line 71 is difficult.

The purge control valve (PCV) 74 is an electromagnetic valve provided in the middle of the purge line 73.

The PCV 74 can be switched between an open state and a close state in response to a command from the engine control unit 100.

The engine control unit (ECU) 100 centrally controls the engine 1 and its auxiliaries.

The engine control unit 100 includes an information processing unit, such as a central processing unit (CPU), a storage unit, such as a random access memory (RAM) and a read-only memory (ROM), an input-output interface, a bus that connects these units, etc.

Figure 2:
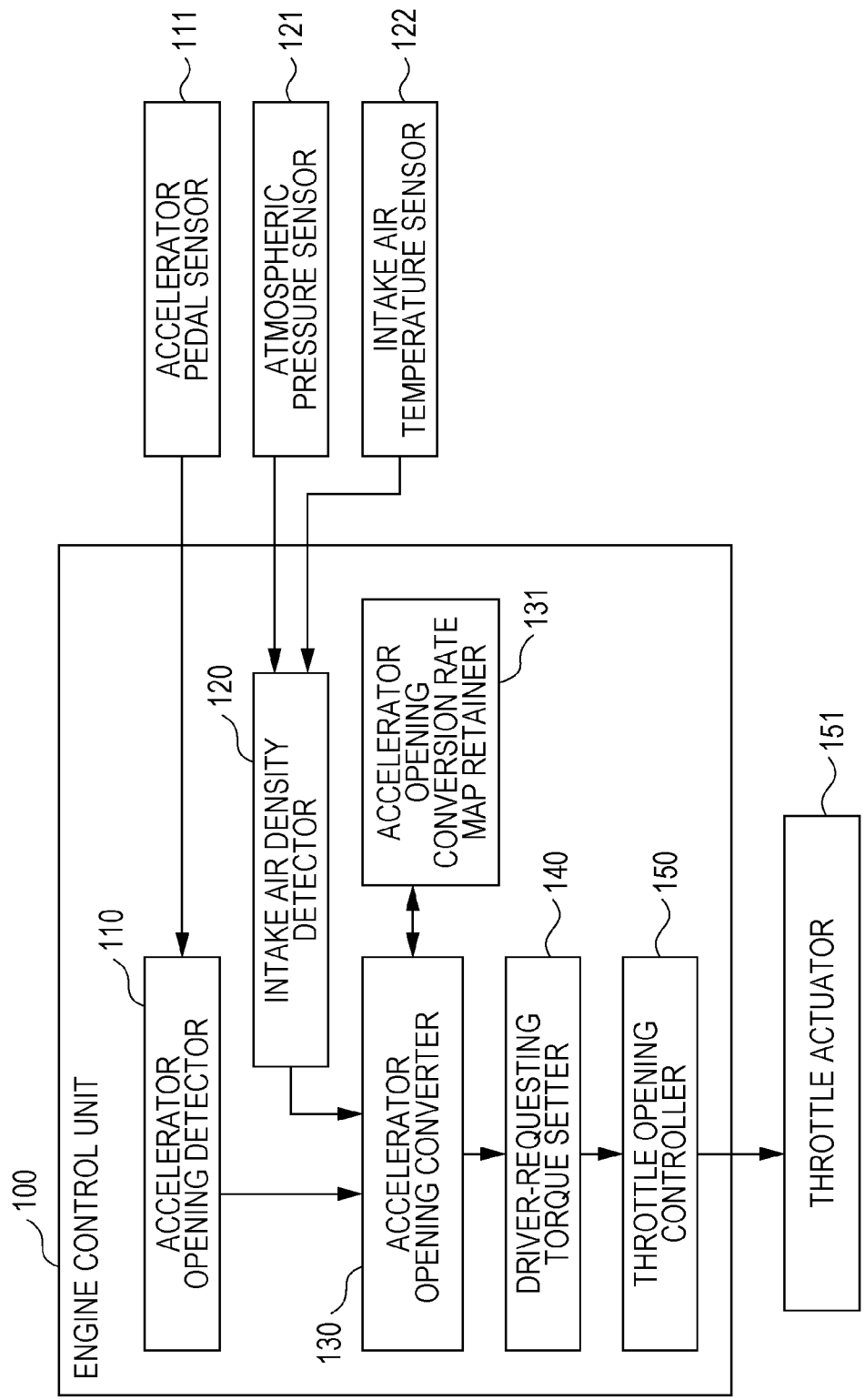
FIG. 2 is a block diagram schematically illustrating a configuration for throttle opening control r in the engine control apparatus of the first embodiment.

FIG. 2 is a block diagram schematically illustrating a configuration for throttle opening control in the engine control apparatus of the first embodiment.

The engine control unit 100 includes an accelerator opening detector 110, an intake air density detector 120, an accelerator opening converter 130, a driver-requesting torque setter 140, a throttle opening controller 150, etc.

The accelerator opening detector 110 detects the opening (the amount of operation when a full-close state is assumed to be 0% and a full-open state is assumed to be 100%) of the accelerator pedal that is an operation member used by the driver to input an acceleration request.

To the accelerator opening detector 110, an accelerator pedal sensor 111 that is provided for the accelerator pedal to detect the amount of operation thereof is coupled.

The intake air density detector 120 detects the intake air density, which is the density of air (atmosphere) introduced into the intake system 50 of the engine 1.

To the intake air density detector 120, an atmospheric pressure sensor 121 and an intake air temperature sensor 122 are coupled.

The atmospheric pressure sensor 121 detects atmospheric pressure around the vehicle.

The intake air temperature sensor 122 detects the temperature (intake air temperature) of air introduced into the intake system 50.

The intake air density detector 120 calculates the intake air density on the basis of the atmospheric pressure and the intake air temperature.

The accelerator opening converter 130 performs a conversion process (correction process) described below for the accelerator opening detected by the accelerator opening detector 110 in a case where the intake air density detected by the intake air density detector 120 is in a low intake air density state where the intake air density is lower than that in a normal intake air density state (at the sea level and the atmospheric temperature) by a predetermined value or more.

The accelerator opening converter 130 includes an accelerator opening conversion rate map retainer 131.

The accelerator opening conversion rate map retainer 131 retains an accelerator opening conversion rate by which the accelerator opening is multiplied in the low intake air density state.

Figure 3:
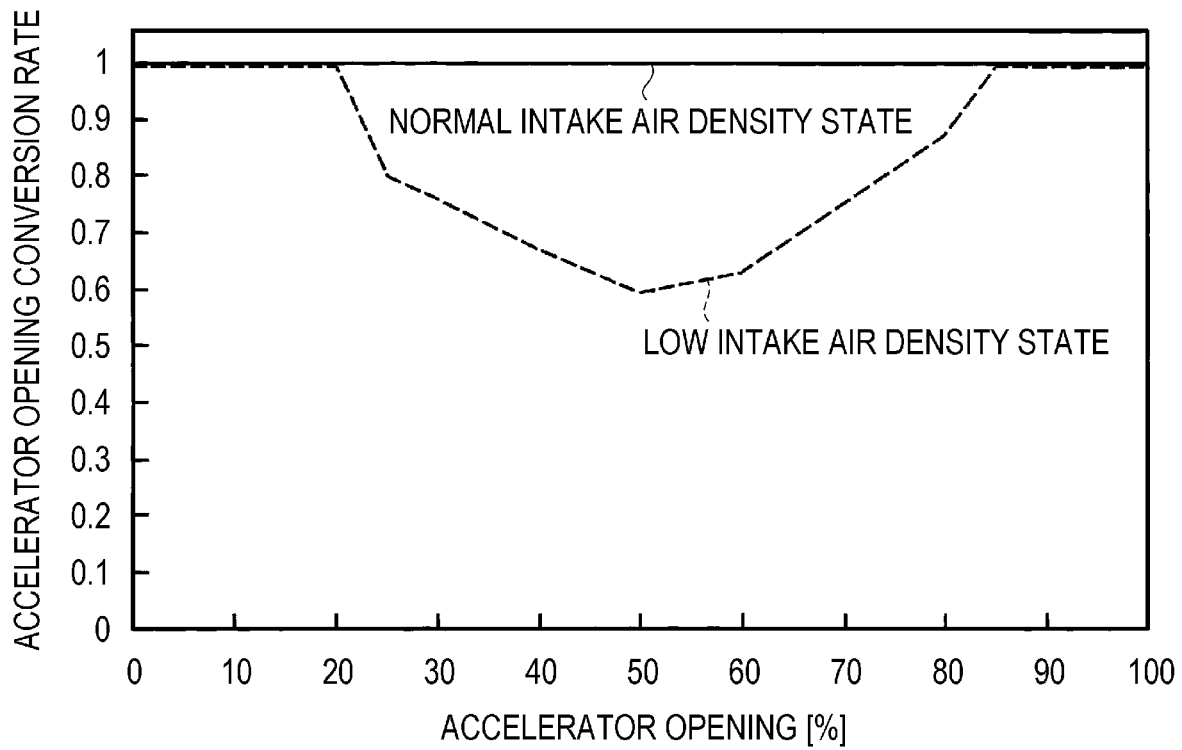
FIG. 3 is a diagram illustrating an example accelerator opening conversion rate in a low intake air density state in the engine control apparatus of the first embodiment.

FIG. 3 is a diagram illustrating an example accelerator opening conversion rate in the low intake air density state in the engine control apparatus of the first embodiment.

In FIG. 3, the horizontal axis represents the accelerator opening detected by the accelerator opening detector 110 and the vertical axis represents the conversion rate.

The conversion rate at normal times is represented by a solid line, and the conversion rate in the low intake air density state is represented by a dashed line.

As illustrated in FIG. 3, at normal times, the conversion rate is equal to 1 for all values of the accelerator opening, and conversion is not performed.

On the other hand, in the low intake air density state, in a range where the accelerator opening is, for instance, 20% or more, the conversion rate starts decreasing as the accelerator opening increases, and in a range where the accelerator opening is, for instance, around 50%, the conversion rate becomes smallest. As the accelerator opening further increases from this point, the conversion rate starts increasing, and in a range where the accelerator opening is, for instance, 80% or more, the conversion rate is equal to 1.

The amount of decrease in the conversion rate from 1 is set such that the absolute value thereof increases in a stepwise manner or continuously in accordance with a decrease in the intake air density.

For instance, the accelerator opening conversion rate map retainer 131 can retain different conversion value maps for respective different intake air density levels.

In the low intake air density state, the accelerator opening converter 130 reads from the accelerator opening conversion rate map retainer 131 a conversion rate for an accelerator opening input from the accelerator opening detector 110 and multiples the accelerator opening by the read conversion rate to calculate an accelerator opening conversion value.

Figure 4:
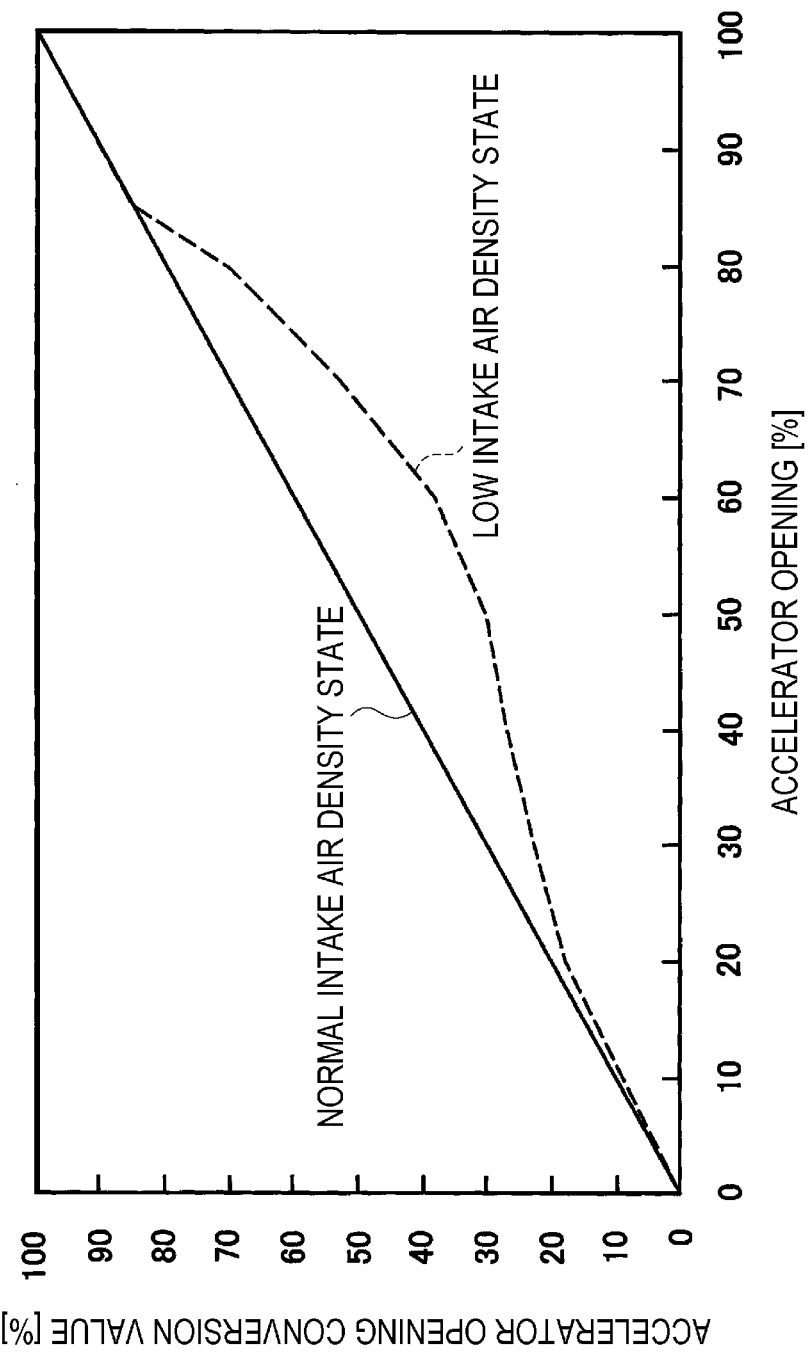
FIG. 4 is a diagram illustrating a correlation between accelerator openings before and after conversion in the engine control apparatus of the first embodiment.

FIG. 4 is a diagram illustrating a correlation between accelerator openings before and after conversion in the engine control apparatus of the first embodiment.

In FIG. 4, the horizontal axis represents an actual accelerator opening detected by the accelerator opening detector 110, and the vertical axis represents the accelerator opening conversion value (the same applies to FIG. 7 described below).

As illustrated in FIG. 4, in a range where the accelerator opening is around, for instance, from 20% to 50%, the increase rate of the accelerator opening conversion value to be used in control of the throttle opening is suppressed relative to the increase rate of the actual accelerator opening. Accordingly, the sensitivity (gain) of an increase in the throttle opening relative to an increase in the actual accelerator opening is decreased in this range, which is a state where the accelerator operation is moderated.

The driver-requesting torque setter 140 sets a driver-requesting torque that is a target torque for output control of the engine 1 on the basis of the accelerator opening conversion value calculated by the accelerator opening converter 130.

The throttle opening controller 150 controls the throttle actuator 151 that drives the throttle valve 56 so that the driver-requesting torque and the actual torque of the engine 1 match.

The effects of the first embodiment will be described below while compared to a comparative example for the disclosure described below.

In the comparative example and embodiments described below, a component the same as that in the above-described embodiment is assigned the same reference numeral to omit a description thereof, and mainly differences are described.

An engine control apparatus of the comparative example performs common throttle opening control in which accelerator opening conversion is not performed either in a case where the intake air density (the density of air taken into the engine) is in a normal state (normal intake air density state) as in a case of the sea level and the atmospheric temperature or in a state where the intake air density is lower than that at normal times (low intake air density state) as in a case of, for instance, a highland area or a high temperature.

Figure 5A:
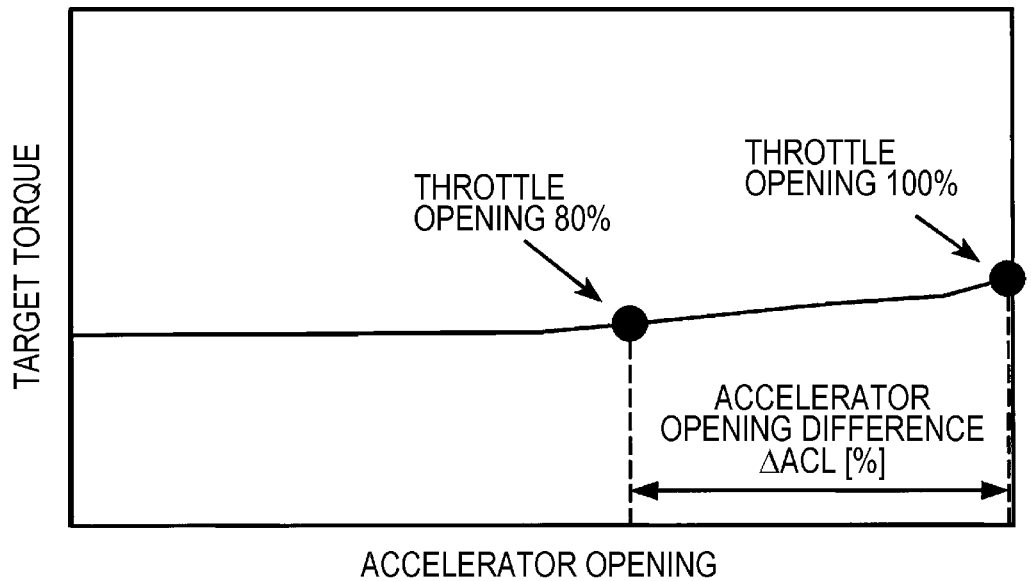
FIG. 5A and FIG. 5B are diagrams illustrating example correlations between an accelerator opening and an output torque in a normal state and in a low intake air density state in an engine control apparatus that is a comparative example for the disclosure.
Figure 5B:
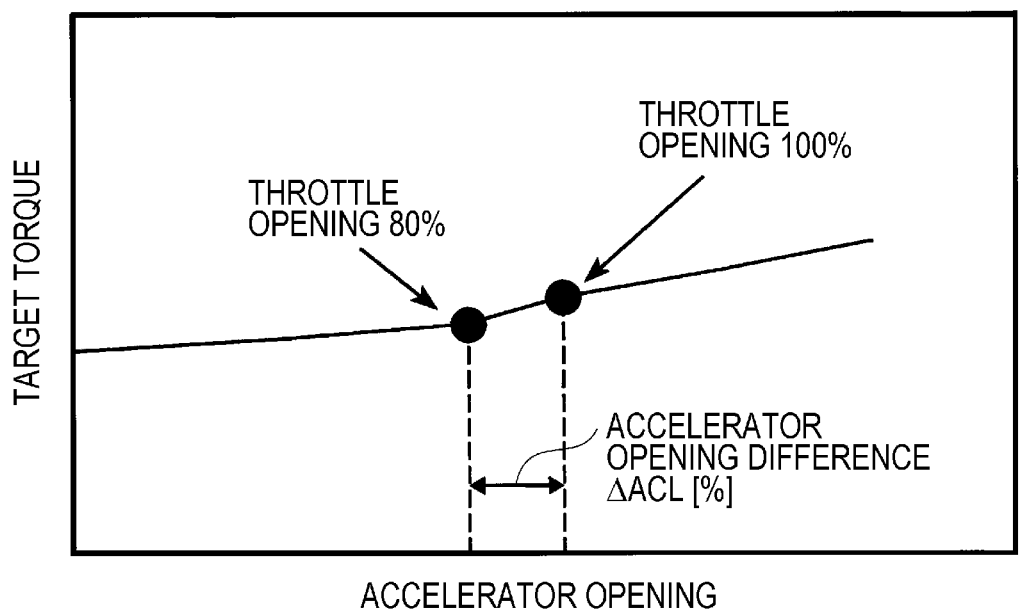

FIG. 5A and FIG. 5B are diagrams illustrating example correlations between the accelerator opening and the output torque in the normal state and in the low intake air density state in the engine control apparatus of the comparative example.

FIG. 5A illustrates the normal state (flats), and FIG. 5B illustrates the low intake air density state (equivalent to 3000 m above the sea level).

In both FIG. 5A and FIG. 5B, the horizontal axis represents the accelerator opening and the vertical axis represents the target torque (driver-requesting torque).

When the normal state illustrated in FIG. 5A and the low intake air density state illustrated in FIG. 5B are compared to each other, it is found that, for instance, the opening difference ΔACL between the accelerator opening when the throttle opening is 80% and the accelerator opening when the throttle opening is 100% in the low intake air density state decreases to, for instance, about a fraction of that in the normal state.

In such a range, for instance, hunting occurs where the throttle opening drastically changes in response to, for instance, even slight motion of the accelerator pedal that is at the level of car body vibrations, which compromises drivability or comfort.

On the other hand, in the first embodiment, in the range where the throttle opening sensitively changes to excess (sensitivity is excessive) relative to a change in the accelerator opening, the accelerator opening is converted, and a change in the throttle opening relative to a change in the accelerator opening is moderated, thereby preventing the occurrence of hunting due to the throttle opening.

As described above, with the first embodiment, the following effects can be attained.

(1) In a range where the sensitivity of the throttle opening relative to the accelerator opening increases in the low intake air density state, the sensitivity is decreased. Accordingly, the occurrence of hunting where the throttle opening sensitively responds to an accelerator operation to excess can be prevented even in the low intake air density state, which leads to proper control.

(2) The amount of decrease in sensitivity is increased in a stepwise manner or continuously in accordance with a decrease in the intake air density. Accordingly, the above-described effect can be properly attained in accordance with a change in the intake air density.

(3) The conversion rate map that is used in the low intake air density state and from which a conversion rate that differs in accordance with the accelerator opening is read is provided, and the throttle opening is controlled on the basis of an accelerator opening conversion value obtained by multiplying an accelerator opening input from the accelerator opening detector by the conversion rate. Accordingly, the above-described effects can be properly obtained with the simple configuration.

(4) In the low intake air density state, in a range (for instance, a range where the accelerator opening is 20% or less) where the accelerator opening is smaller than that in a range where the sensitivity is decreased, the sensitivity is set to a value equivalent to the sensitivity in the normal state (a state that is not the low intake air density state), which can prevent the driver from being given an uneasy feeling.

Second Embodiment

Now, a second embodiment of the engine control apparatus to which the disclosure is applied will be described.

FIG. 6 is a block diagram schematically illustrating a configuration for throttle opening control in the engine control apparatus of the second embodiment.

The engine control apparatus of the second embodiment includes an accelerator opening conversion value map retainer 131A described below instead of the accelerator opening conversion rate map retainer 131 of the first embodiment.

The accelerator opening conversion value map retainer 131A retains an accelerator opening conversion value map from which an accelerator opening conversion value illustrated in FIG. 4 is directly read in accordance with an accelerator opening input from the accelerator opening detector 110.

In the second embodiment, the accelerator opening converter 130 outputs to the driver-requesting torque setter 140 the accelerator opening conversion value read from the accelerator opening conversion value map retainer 131A instead of performing calculation using a conversion rate as described in the first embodiment.

Also with the second embodiment described above, effects the same as those of the first embodiment described above can be attained.

Third Embodiment

Now, a third embodiment of the engine control apparatus to which the disclosure is applied will be described.

Figure 7:
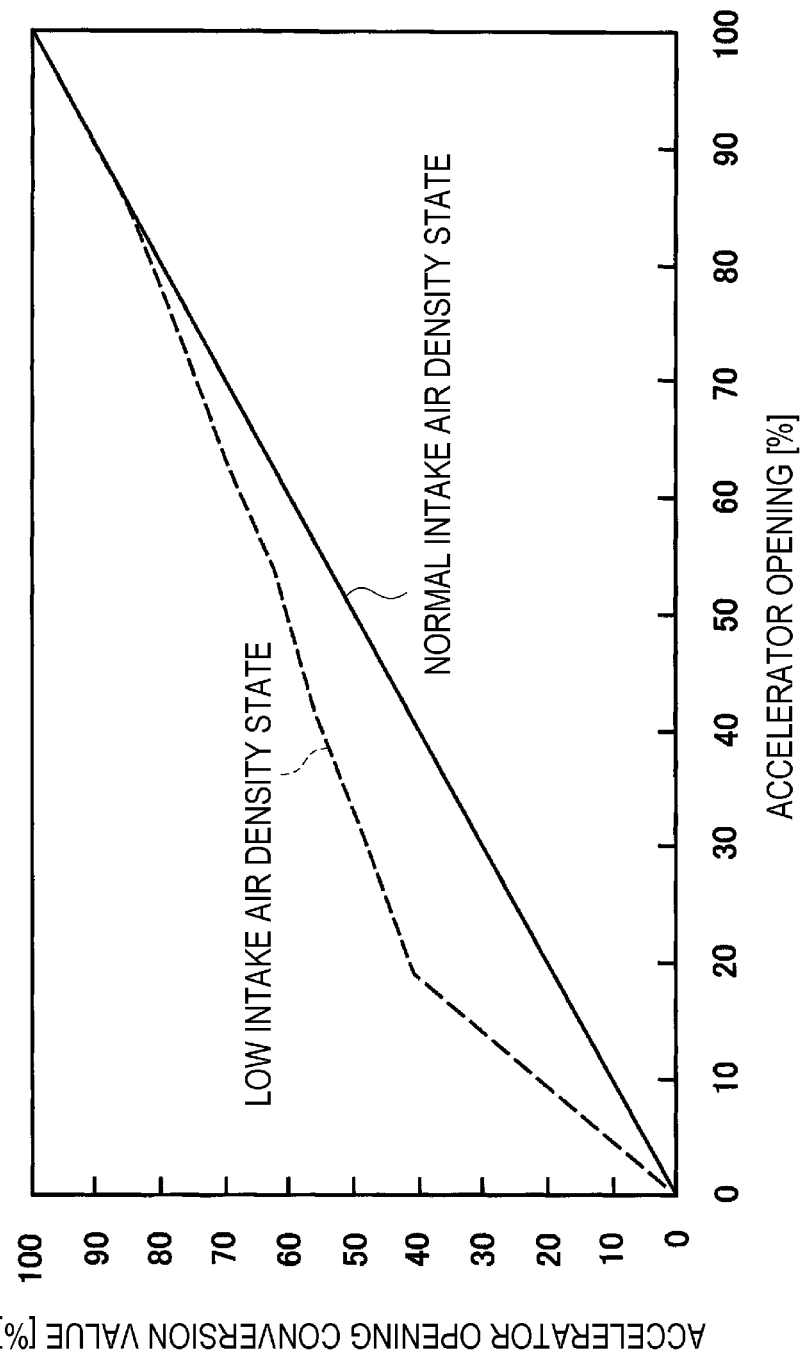
FIG. 7 is a diagram illustrating a correlation between accelerator openings before and after conversion in an engine control apparatus according to a third embodiment of the disclosure.

FIG. 7 is a diagram illustrating a correlation between accelerator openings before and after conversion in the engine control apparatus of the third embodiment.

In the third embodiment, in a range where the accelerator opening is low (for instance, 20% or less), the increase rate of the accelerator opening conversion value relative to an increase in the accelerator opening is made higher in the low intake air density state than that in the normal state. In a range where the accelerator opening is 20% or more, the increase rate of the accelerator opening conversion value relative to an increase in the accelerator opening is made lower.

Accordingly, in the range where the accelerator opening is, for instance, 20% or more, also the sensitivity of an increase in the throttle opening relative to an increase in an input accelerator opening is reduced.

With the third embodiment described above, when the amount of accelerator operation is increased from a low load state, the throttle can be quickly opened in a range where the accelerator opening is relatively small, and in a range where the accelerator opening is larger and the sensitivity of the throttle opening relative to the accelerator opening decreases, the range of accelerator opening that can be used in regulation of the throttle opening is increased to improve control performance.

Modifications

The disclosure is not limited to the above-described embodiments, and various modifications and changes can be made, which are within the technical scope of the disclosure.

(1) The configuration of the engine control apparatus and that of the engine are not limited to those of the embodiments described above and can be changed as appropriate.

For instance, the number of cylinders, the cylinder layout, the fuel injection method, the presence of the supercharger, etc. of the engine can be changed as appropriate as long as the output of the engine is regulated by the throttle.

(2) In the embodiments, the low intake air density state is detected on the basis of atmospheric pressure and the intake air temperature; however, the method for detecting the low intake air density state is not limited to this and can be changed as appropriate. For instance, information about the altitude (the height above the sea level) may be obtained with a position determination method using 3D map data or a global positioning system (GPS), and in a case of a high altitude, the low intake air density state may be determined.

As described above, with the disclosure, it is possible to provide an engine control apparatus that properly controls the opening of the throttle valve regardless of a change in the intake air density.

The engine control unit 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the engine control unit 100 including the accelerator opening detector 110, the intake air density detector 120, the accelerator opening converter 130, the accelerator opening conversion rate map retainer 131, the driver-requesting torque setter 140, and the throttle opening controller 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An engine control apparatus, comprising:
  a throttle valve configured to regulate an intake air volume of an engine;
  a controller configured to:
    detect an accelerator opening that is an amount of operation of an accelerator operation member on which a driver performs an accelerator operation;
    increase a throttle opening of the throttle valve in accordance with an increase in the accelerator opening; and
    detect information about an intake air density of the engine,
  wherein, in a low intake air density state, where the intake air density is equal to or lower than a predetermined value and where an acceleration opening difference for a given throttle opening difference is reduced in comparison to a normal state, the controller is configured to decrease a sensitivity of the throttle opening relative to the accelerator opening in a partial range of a range within which the accelerator opening is variable.

2. The engine control apparatus according to claim 1, wherein the controller increases an amount of decrease in the sensitivity in accordance with a decrease in the intake air density in a stepwise manner or continuously.

3. The engine control apparatus according to claim 1, wherein the controller comprises a conversion rate map that is to be used in the low intake air density state and from which a conversion rate that differs in accordance with the accelerator opening is read, and controls, on a basis of an accelerator opening conversion value obtained by multiplying an accelerator opening input from the controller by the conversion rate, the throttle opening to decrease the sensitivity.

4. The engine control apparatus according to claim 2, wherein the controller comprises a conversion rate map that is to be used in the low intake air density state and from which a conversion rate that differs in accordance with the accelerator opening is read, and controls, on a basis of an accelerator opening conversion value obtained by multiplying an accelerator opening input from the controller by the conversion rate, the throttle opening to decrease the sensitivity.

5. The engine control apparatus according to claim 1, wherein the controller comprises an accelerator opening conversion value map that is to be used in the low intake air density state and from which an accelerator opening conversion value is read on a basis of an accelerator opening input from the controller, and controls, on a basis of the accelerator opening conversion value read from the accelerator opening conversion value map, the throttle opening to decrease the sensitivity.

6. The engine control apparatus according to claim 2, wherein the controller comprises an accelerator opening conversion value map that is to be used in the low intake air density state and from which an accelerator opening conversion value is read on a basis of an accelerator opening input from the controller, and controls, on a basis of the accelerator opening conversion value read from the accelerator opening conversion value map, the throttle opening to decrease the sensitivity.

7. The engine control apparatus according to claim 1, wherein, in the low intake air density state, the sensitivity is set so as to be equivalent to the sensitivity in a state that is not the low intake air density state in a range where the accelerator opening is smaller than the range where the sensitivity is decreased.

8. The engine control apparatus according to claim 2, wherein, in the low intake air density state, the sensitivity is set so as to be equivalent to the sensitivity in a state that is not the low intake air density state in a range where the accelerator opening is smaller than the range where the sensitivity is decreased.

9. The engine control apparatus according to claim 3, wherein, in the low intake air density state, the sensitivity is set so as to be equivalent to the sensitivity in a state that is not the low intake air density state in a range where the accelerator opening is smaller than the range where the sensitivity is decreased.

10. The engine control apparatus according to claim 4, wherein, in the low intake air density state, the sensitivity is set so as to be equivalent to the sensitivity in a state that is not the low intake air density state in a range where the accelerator opening is smaller than the range where the sensitivity is decreased.

11. The engine control apparatus according to claim 5, wherein, in the low intake air density state, the sensitivity is set so as to be equivalent to the sensitivity in a state that is not the low intake air density state in a range where the accelerator opening is smaller than the range where the sensitivity is decreased.

12. The engine control apparatus according to claim 6, wherein, in the low intake air density state, the sensitivity is set so as to be equivalent to the sensitivity in a state that is not the low intake air density state in a range where the accelerator opening is smaller than the range where the sensitivity is decreased.

13. The engine control apparatus according to claim 1, wherein, in the low intake air density state, the sensitivity is made higher than the sensitivity in a state that is not the low intake air density state in a range where the accelerator opening is smaller than the range where the sensitivity is decreased.

14. The engine control apparatus according to claim 2, wherein, in the low intake air density state, the sensitivity is made higher than the sensitivity in a state that is not the low intake air density state in a range where the accelerator opening is smaller than the range where the sensitivity is decreased.

15. The engine control apparatus according to claim 3, wherein, in the low intake air density state, the sensitivity is made higher than the sensitivity in a state that is not the low intake air density state in a range where the accelerator opening is smaller than the range where the sensitivity is decreased.

16. The engine control apparatus according to claim 4, wherein, in the low intake air density state, the sensitivity is made higher than the sensitivity in a state that is not the low intake air density state in a range where the accelerator opening is smaller than the range where the sensitivity is decreased.

17. The engine control apparatus according to claim 5, wherein, in the low intake air density state, the sensitivity is made higher than the sensitivity in a state that is not the low intake air density state in a range where the accelerator opening is smaller than the range where the sensitivity is decreased.

18. The engine control apparatus according to claim 6, wherein, in the low intake air density state, the sensitivity is made higher than the sensitivity in a state that is not the low intake air density state in a range where the accelerator opening is smaller than the range where the sensitivity is decreased.

19. The engine control apparatus according to claim 1, wherein the controller is further configured to increase an amount of decrease in the sensitivity in accordance with a decrease in the intake air density.

20. An engine control apparatus, comprising:
   a throttle valve configured to regulate an intake air volume of an engine; and
   a circuitry configured to:
      detect an accelerator opening that is an amount of operation of an accelerator operation member on which a driver performs an accelerator operation;
      increase a throttle opening of the throttle valve in accordance with an increase in the accelerator opening;
      detect information about an intake air density of the engine; and
      in a low intake air density state, where the intake air density is equal to or lower than a predetermined value and where an acceleration opening difference for a given throttle opening difference is reduced in comparison to a normal state, decrease a sensitivity of the throttle opening relative to the accelerator opening in a partial range of a range within which the accelerator opening is variable.

\* \* \* \* \*